Patented Apr. 19, 1932

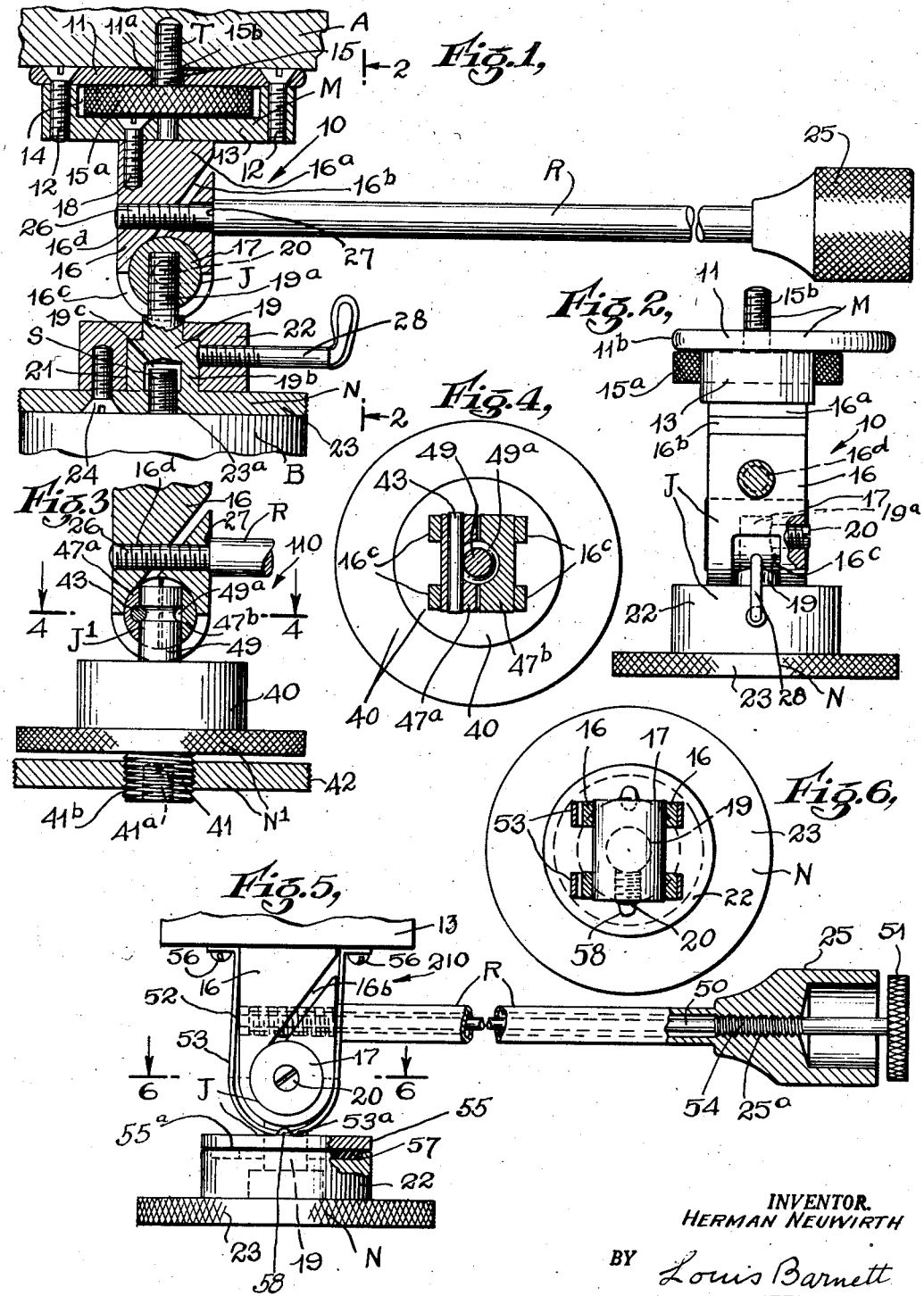

1,854,951

UNITED STATES PATENT OFFICE

HERMAN NEUWIRTH, OF BROOKLYN, NEW YORK

SWIVEL MOUNTING

Application filed June 12, 1929. Serial No. 370,250.

This invention relates to devices or fittings for mounting instruments and apparatus on a support for pivoting or swivelling adjustment or movement. More particularly this invention is directed to devices and fittings of the character described for mounting still and moving picture cameras, telescopes and microphones on tripods or the like supports whereby the cameras, telescopes or microphones may be easily and quickly adjusted in various desired positions or directions.

Among the objects of the invention is to generally improve the construction of devices or fittings of the character described and to provide a neat appearing yet compact structure comprising few and simple parts, which shall be readily assembled, cheap to manufacture, and practical and efficient to a high degree in use.

Other objects of this invention will in part be obvious and in part hereinafter pointed out.

This invention accordingly consists in the features of construction, combinations of elements and arrangements of parts which will be exemplified in the constructions hereinafter described and of which the scope of application will be indicated in the following claims.

In the accompanying drawings, in which are shown various possible illustrative embodiments of this invention.

Fig. 1 is a cross-section view taken through an improved camera mounting fitting showing the interior construction of one embodiment of the invention, only a fragmentary portion of the camera and tripod or support being shown.

Fig. 2 is an elevational view of the improved mounting fitting looking in the direction of the line 2—2 in Fig. 1 with the camera and support removed.

Fig. 3 is a fragmentary elevation view, partly in section, showing a modified construction of camera mounting fitting embodiment in the invention.

Fig. 4 is a cross-sectional view taken on lines 4—4 in Fig. 3.

Fig. 5 is a fragmentary elevational view of camera mounting fitting showing another embodiment of the invention, partly broken apart to expose the interior construction, and Fig. 6 is a cross sectional view taken on lines 6—6 in Fig. 5.

Referring in detail to the drawings, and more particularly to Figs. 1 and 2, 10 denotes an improved device or fitting embodying the invention adapted to mount on apparatus A, such as a still or moving picture camera, telescope or microphone, for pivoting or swivelling movement on a suitable support B, such as a tripod or base. Only a fragmentary portion of the apparatus A and base B are here shown, said apparatus A, as for example, a camera, being provided with a standard sized threaded hole T adapted to engage with the screw stud S extending up from the base B for fixedly mounting the camera on the base in the well understood manner.

The improved fitting 10 is interposed between the base B and the apparatus A to facilitate adjusting and swinging said apparatus with respect to the base in the manner hereinafter described.

Said fitting 10 is seen to comprise a universal joint J terminated at its upper end with an apparatus mounting M and at its lower end with the base mounting N, and an extension rod R for guiding and controlling the swing movement of the joint J.

The upper mounting M may comprise a plate 11 secured by screws 12 over the open end of a U-shaped piece 13 to provide a cavity 14. Loosely fitted in said cavity is a knurled head 15a of a fastening screw 15, the thread shank 15b of said screw extending up through a hole 11a provided in the plate 11. Said thread shank is of standard size to correspond to the threaded hole T of the apparatus A. Thus by manipulating the knurled head 15a, the apparatus A may be firmly mounted in position against the plate 11 through the engagement of the shank 15b in the threaded hole T. The plate 11 may be cut away at 11b to provide clearance for the crank-handle (not shown) of a moving picture camera.

The joint J may comprise a plurality of interconnected pivoting mechanisms and includes an expansible and compressible strap member 16 which trunnions on a horizontally disposed stub shaft 17. The end 16a of said member 16 spaced from said shaft 17 is fixedly secured to carry the U-shaped piece 13 of the upper mounting M by any suitable means, such as screws 18. Said member 16 has an angularly cut slot 16b communicating with the bearing end 16c to provide a spring clamping structure engaging the stub shaft 17. The latter may be fixedly secured to the upper thread end 19a of a stanchion 19, a set screw 20 being provided to extend into the end of said shaft 17 for locking the latter to the stanchion end 19a. The end 16c of the strap member is bifurcated to permit the free passage of the stanchion 19 therethrough, said construction also retains the strap member 16 and stub shaft 17 assembled and forms one of said pivoting mechanisms which permits swinging the upper mounting M in a vertical plane about the stub shaft 17.

The other pivoting mechanism may be formed by revolvably mounting the enlarged lower end 19b of the stanchion 19 in bearing cavity 21. The latter is provided in the base mounting N and is formed by a housing piece 22 secured to a lower plate 23 in any suitable manner, as by screws 24. The plate 23 is centrally tapped at 23a for receiving the screw stud S of the base B. The lower stanchion end 19b may be recessed as at 19c to provide clearance for the screw stud S. The last mentioned pivoting mechanism permits rotating in a horizontal plane all the parts of the fitting 10 above the base mounting N with the stanchion serving as an axis. The joint J thus provides for independent or concomitant swinging movements in vertical and horizontal planes of the apparatus A from the base B.

The extension rod R is terminated with a handle 25, said bar being made sufficiently long so as to space the handle beyond the apparatus or base and to provide a convenient control and a leverage for swinging the apparatus A on the joint J.

To releasably lock each of said pivoting mechanisms independently against swinging movement, suitable means are provided. The vertical plane swing movement may be restrained by providing a tapped hole 16d in the strap member 16 for engaging with the thread end 26 of the rod R, said hole 16d being located to position the rod end 26 to extend through the slot 16b. There is a shoulder 27 on said rod to bear against the side of said strap member 16 so that the spring clamping end 16c may be caused to rigidly grip the stud shaft 17 on screwing up the rod R for preventing swinging movement of the apparatus in a vertical plane.

The horizontal plane swinging movements may be restrained by a screw key 28 threaded into the housing piece 22 for bearing against stanchion end 19b.

The practical operation of the fitting 10 will now be apparent. Where it is required to set, adjust or swingably move apparatus A, such as a camera, telescope or microphone on a relatively stationary base B, the fitting 10 is interposed between the base and apparatus. With the locking means in a released position the apparatus A may be guided and its movement controlled by simple manipulating of the handle 25, screwing in the rod R locks the fitting against vertical swinging movement and screwing in the key 27 locks the fitting against horizontal movements. If it is necessary to set the apparatus A in a particular position, said apparatus is brought to the desired position by means of the handle 25 and the locking means made effective to retain the mechanisms forming the joint J against movement in the manner described above.

In Figs. 3 and 4, a modified form 110 of the invention is shown. Here the means for releasably locking the joint J1 against all swinging movements is effected by merely screwing in the rod R thereby eliminating the use of the screw key 28 shown in Figs. 1 and 2. Said locking means includes a base plate N1 provided with a flanged plate 40 having a downwardly extending stud 41. The latter is axially tapped with a hole 41a for receiving the screw stud S of the base B and is provided with a left-hand exterior screw thread 41b. Engaging the said threads 41b is a knurled rim locking nut 42. The nut 42 when tightened against the base B (not shown) will firmly retain the fitting 110 from loosening when swivelling the apparatus A on the joint J1.

The stanchion 49 projects up from the plate 40 and is formed with an annular groove 49a. The stub shaft engaged by the clamping strap member 16 is split and comprises the halves 47a and 47b. A pin 43 is fitted into the half 47a and is located to extend through the groove 49a. The parts of the fitting 110 above the strap member 16, assembled as here described, may be swung in a horizontal plane about the stanchion 49 and in a vertical plane about the split halves forming the stub shaft.

The rod R on being screwed into the threaded hole 16d is obviously effected to simultaneously clamp the joint J1 against all swinging movement.

The modified form 210 of the invention shown in Figs. 5 and 6 is similar in construction to that described above and shown in Figs. 1 and 2 with the exception that the rod R is made hollow to provide for the passage of a push bar 50. Said bar has a knob 51 at one end adjacent the handle 25 and has its other end a shoe 52 adapted to abut a spring 53 which loops about the strap member 16. An intermediate portion 54 of the bar is threaded for engaging with the tapped hole 25a provided in the handle 25. The bight portion 53a of the spring carries a shoe 55 preferably having a frictional surface 55a which engages with a braking member 57 embedded in the housing piece 22. Spaced lugs 58 on the shoe 55 retain the latter to move with the spring bight 53a. The spring ends may be secured in position by screws 56. Normally the spring 53 presses the shoe 52 against the braking member 57 and retains the joint J against horizontal swinging movements. By screwing up on the knob 51, the bar 50 pushes on the spring and releases the pressure on the shoe 52 on said braking member 57.

The joint J is thus permitted to freely swing in a horizontal plane. The locking of the swing movement of the joint J in a vertical plane is effected in the same manner as described above for the fitting 10, namely by screwing up the rod R the member 16 is caused to clamp the shaft 17.

It will thus be seen that there is provided devices in which the several objects of this invention are achieved and which are well adapted to meet the conditions of practical use.

As various possible embodiments might be made of the above invention, and as various changes might be made in the embodiment above set forth, it is to be understood that all matters herein set forth or shown in the accompanying drawings are to be interpreted as illustrative and not in a limiting sense.

Having thus described my invention, I claim as new and desire to secure by Letters Patent:

1. In a device of the character described, a universal joint comprising a plurality of pivoting mechanisms, said joint terminating at each end by a coupling mounting, an elongated extension carried by one of said mechanisms, a handle terminating said extension for controlling the movement of said joint from a spaced distance thereof, and a pair of releasable locking means adapted for concomitant actuation from said handle for retaining said joint against movement.

2. In a device of the character described, a universal joint comprising a plurality of pivoting mechanisms, said joint terminating at each end by a coupling mounting, an elongated extension carried by one of said mechanisms for controlling the movement of said joint from a spaced distance thereof, said mechanisms being adapted for selective and concomitant swinging movement in right angle planes, and means on said extension for selectively releasably locking said joint against movement in each plane.

3. A swivelling device of the character described comprising a pair of spaced coupling members interconnected by a universal joint, said joint including a stanchion revolvably carried by one of said members, a stud shaft terminating said stanchion, and an expansible and compressible clamping bearing engaging with said shaft carried by the other of said members.

4. A swivelling device of the character described comprising a pair of spaced coupling members interconnected by a universal joint, said joint including a stanchion carried by one of said members, a stud shaft terminating said stanchion, an expansible and compressible bearing mounted on said shaft, and clamping means for securing said bearing against moving on the shaft, said clamping means including a handle extending a substantial distance from said joint as and for the purpose described and specified.

In testimony whereof I affix my signature.

HERMAN NEUWIRTH.